(12) United States Patent
Quan et al.

(10) Patent No.: US 6,327,422 B1
(45) Date of Patent: *Dec. 4, 2001

(54) METHOD AND APPARATUS FOR MODIFYING THE EFFECTS OF COLOR BURST MODIFICATIONS TO A VIDEO SIGNAL

(75) Inventors: Ronald Quan; John O. Ryan, both of Cupertino, CA (US)

(73) Assignee: Macrovision Corp, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/042,680
(22) Filed: Mar. 12, 1998

Related U.S. Application Data

(62) Division of application No. 08/897,132, filed on Jul. 18, 1997, now Pat. No. 5,784,523.

(51) Int. Cl.[7] ................................................ H04N 5/91
(52) U.S. Cl. ............................................. 386/94; 380/201
(58) Field of Search ............................ 386/94, 1; 380/5, 380/14, 15, 22, 201, 213; 360/60

(56) References Cited

U.S. PATENT DOCUMENTS

| | | | |
|---|---|---|---|
| 4,571,615 | * 2/1986 | Robbins et al. | 380/15 |
| 4,577,216 | * 3/1986 | Ryan | 380/5 |
| 4,626,890 | * 12/1986 | Ryan | 380/5 |
| 4,631,603 | * 12/1986 | Ryan | 386/9 |
| 4,742,544 | * 5/1988 | Kupnicki et al. | 380/14 |
| 4,860,089 | * 8/1989 | Smith | 348/194 |
| 5,784,523 | * 7/1998 | Quan et al. | 386/94 |
| 6,035,094 | 3/2000 | Kori | 386/94 |
| 6,041,158 | 3/2000 | Sato | 386/1 |

\* cited by examiner

*Primary Examiner*—Wendy R. Garber
*Assistant Examiner*—Aung S. Moe
(74) *Attorney, Agent, or Firm*—George Almeida

(57) ABSTRACT

In the known color stripe process for preventing recording of video signals, the color burst present on each line of active video is modified so that any subsequent video tape recording of the video signal shows variations in the color fidelity that appear as undesirable bands or stripes of color error. This color stripe process is defeated first by determining the location of the video lines including the color stripe process, either by prior experimentation or by on-line detection. Then some or all of the lines including the modified color bursts are modified so as to render the overall video signal recordable. The modification is accomplished in a number of ways, including phase shifting the color stripe burst into the correct phase, replacing some of the color stripe bursts or a portion of particular color stripe bursts so that they are no longer effective, and mixing the color stripe burst with color stripe signals of the correct phase so as to eliminate most or all of the phase error present. The modified color bursts are defeated, in other versions, by modifying the horizontal sync pulse signals immediately preceding the modified color bursts so that the modified color bursts are not detected by a VCR and hence have no effect.

18 Claims, 11 Drawing Sheets

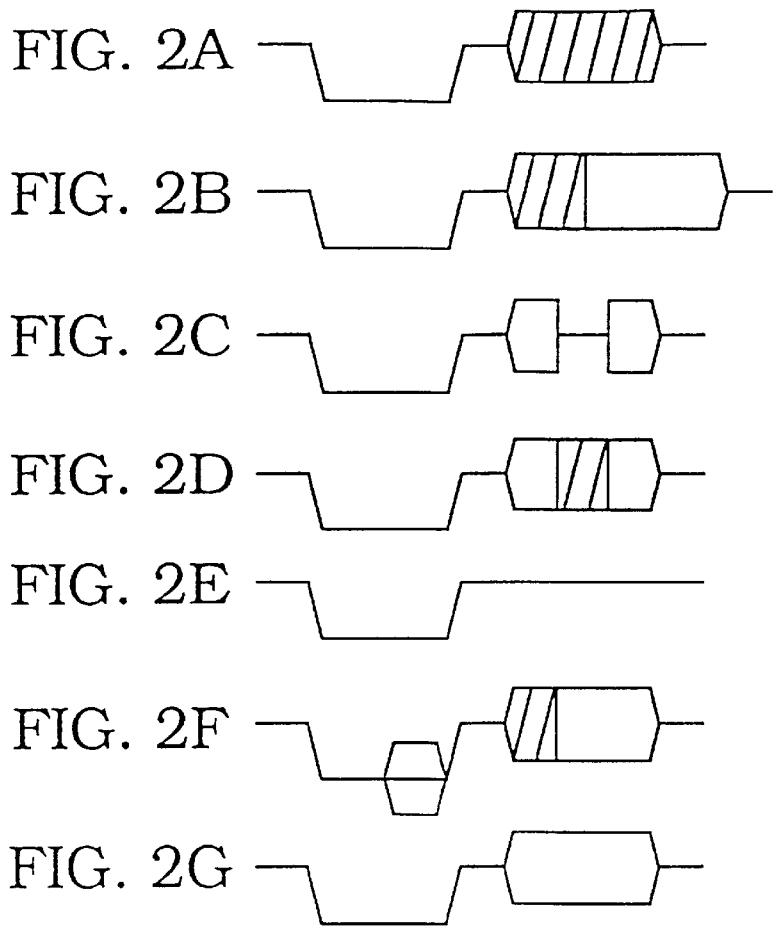
FIG. 2A
FIG. 2B
FIG. 2C
FIG. 2D
FIG. 2E
FIG. 2F
FIG. 2G
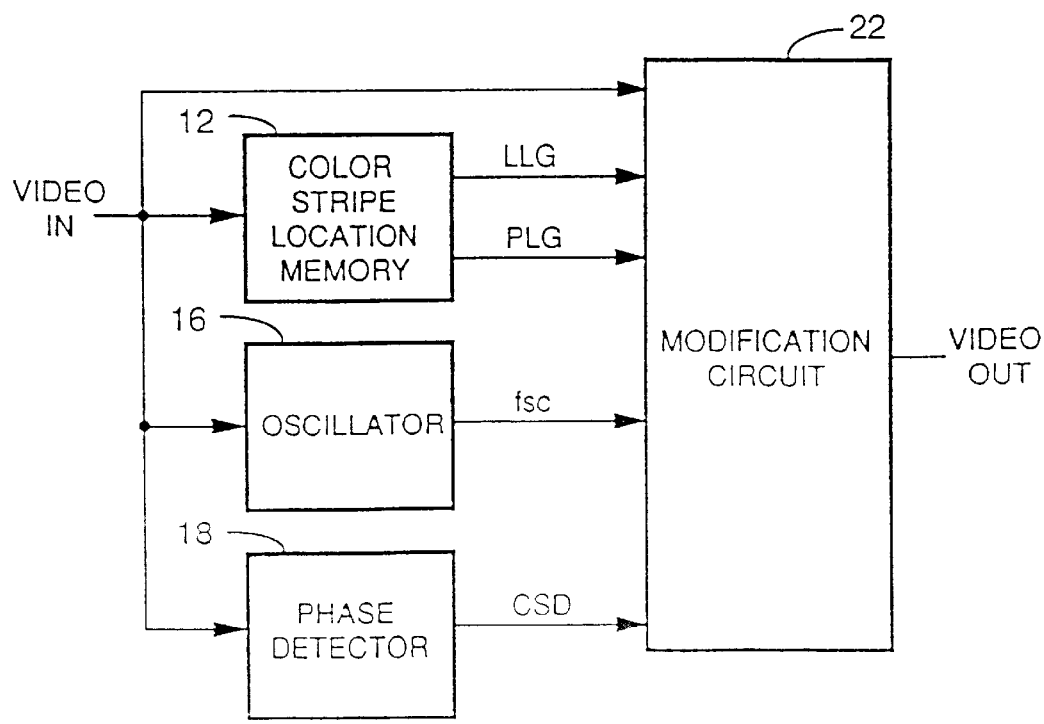
FIG. 3

METHOD AND APPARATUS FOR MODIFYING THE EFFECTS OF COLOR BURST MODIFICATIONS TO A VIDEO SIGNAL

Divisional of prior application No.: 08/897,132, filed Jul. 18, 1997, U.S. Pat. No. 5,784,523

BACKGROUND OF THE INVENTION

1. Field of the Invention

The present invention pertains to a method and apparatus for processing a video signal, and more particularly to removing (defeating) effects of phase modulation of the color burst component of the video signal.

2. Description of the Prior Art

U.S. Pat. No. 4,577,216, "Method and Apparatus For Processing a Video Signal," John O. Ryan, issued Mar. 18, 1986 and incorporated by reference, discloses modifying a color video signal to inhibit the making of acceptable video recordings thereof. A conventional television receiver produces a normal color picture from the modified signal. However, the resultant color picture from a subsequent video tape recording shows variations in the color fidelity that appear as bands or stripes of color error. Colloquially the modifications are called the "color stripe system" or the "color stripe process". Commercial embodiments of the teachings of this patent typically limit the number of video lines per field having the induced color error or color stripes.

Color video signals (both in the NTSC and PAL TV systems) include what is called a color burst. The color stripe system modifies the color burst. The suppression of the color subcarrier signal at the TV transmitter requires that the color TV receiver include (in NTSC) a 3.58 MHz oscillator which is used during demodulation to reinsert the color subcarrier signal and restore the color signal to its original form. Both the frequency and phase of this reinserted subcarrier signal are critical for color reproduction. Therefore, it is necessary to synchronize the color TV receiver's local 3.58 MHz oscillator so that its frequency and phase are in step with the subcarrier signal at the transmitter.

This synchronization is accomplished by transmitting a small sample of the transmitter's 3.58 MHz subcarrier signal during the back porch interval of the horizontal blanking pulse. FIG. 1A shows one horizontal blanking interval for color TV. The horizontal sync pulse, the front porch and blanking interval duration are essentially the same as that for black and white TV. However, during color TV transmission (both broadcast and cable) 8 to 10 cycles of the 3.58 MHz subcarrier that is to be used as the color sync signal are superimposed on the back porch. This color sync signal is referred to as the "color burst" or "burst". The color burst peak-to-peak amplitude (40 IRE for NTSC TV as shown) is the same amplitude as the horizontal sync pulse.

FIG. 1B shows an expanded view of a part of the waveform of FIG. 1A including the actual color burst cycles. During the color TV blanking intervals, such a color burst is transmitted following each horizontal sync pulse.

In one commercial embodiment of the color stripe process, no color burst phase (stripe) modification appears in the video lines that have a color burst signal during the vertical blanking interval. These are lines 10 to 21 in an NTSC signal and corresponding lines in a PAL signal. The color stripe modifications occur in bands of four to five video lines of the viewable TV field followed by bands of eight to ten video lines without the color stripe modulation. The location of the bands is fixed ("stationary") field-to-field. This color stripe process has been found to be quite effective for cable television, especially when combined with the teachings of U.S. Pat. No. 4,631,603 also invented by John O. Ryan and incorporated herein by reference.

In NTSC TV, the start of color burst is defined by the zero-crossing (positive or negative slope) that precedes the first half cycle of subcarrier (color burst) that is 50% or greater of the color burst amplitude. It is to be understood that the color stripe process shifts the phase of the color burst cycles relative to their nominal (correct) position which is shown in FIG. 1B. The phase shifted color burst is shown in FIG. 1C. The amount of phase shift shown in FIG. 1C is 180° (the maximum possible).

Further, the amount of phase shift in the color stripe process can vary from e.g. 20° to 180°; the more phase shift, the greater the visual effect in terms of color shift. In a color stripe process for PAL TV, a somewhat greater phase shift (e.g. 40° to 180°) is used to be effective.

Other variations of the color stripe process are also possible.

U.S. Pat. No. 4,626,890, "Method and Apparatus For Removing Phase Modulation From the Color Burst", John O. Ryan, issued Dec. 2, 1986 and incorporated by reference, discloses removing the phase modulation of the U.S. Pat. No. 4,577,216. This removal is useful in eliminating much of the effects of the process disclosed in U.S. Pat. No. 4,577,216 for recording.

SUMMARY

The present inventors have determined that improvements are possible on the teachings of above mentioned U.S. Pat. No. 4,626,890, especially pertaining to eliminating or reducing the effects of certain variants as described above of the color stripe process of U.S. Pat. No. 4,577,216.

Thus in accordance with the present invention, a circuit modifies and/or removes the color stripe process, or modifies the video signal so the color stripe process is not evident, i.e. has no influence on a television set or VCR.

In one embodiment, the video line locations of the color stripe color bursts are known. That is, it is known in which video lines the color stripe modified bursts occur, as in the above described commercial embodiment of the color stripe process. These locations are stored in a preprogrammed memory which provides signals indicating those video lines. Also, the same preprogrammed memory provides an indication of whether the entire color stripe burst or only a part of it is to be modified.

A modification circuit which also receives the video signal, and uses the information as to the location of the color stripe bursts, removes and/or modifies the color stripe bursts or otherwise modifies the video signal (i.e. modifies the horizontal sync pulse immediately preceding the color stripe burst) so that the effect of the color stripe process is attenuated or eliminated.

With regard to the present invention, it has been found that it is not necessary to completely eliminate the color stripe bursts; with typical commercially available television sets and VCRs, eliminating some of the color stripe bursts or attenuating the color stripe bursts either in terms of amplitude or duration, or removing or attenuating a portion of each or most colorstripe bursts, has been found effective to overcome the effect of the color stripe process, allowing a recordable (copiable) video signal to be produced.

Sometimes the color stripe process is not fixed in line location. Other times, even where it is so fixed, it is not desired or possible to provide the preprogrammed memory. Then instead a phase detector detects, for each video line, the presence of a color stripe burst, i.e. detects color bursts having induced phase modulation. Upon detection of the color stripe burst, the modification circuit (as above) modifies either the color burst or other portions of the video signal (i.e. the horizontal sync pulse) so as to attenuate or eliminate the effect of the color stripe burst.

It is to be understood that correcting or replacing the color stripe bursts in accordance with the invention does not require completely eliminating the phase shift (modulation); a reduction of the phase shift to some small value (e.g. 5° or less for NTSC) has been found to be effective, in that the typical viewer will not perceive the attendant color shift.

Thus, the present method and apparatus have several embodiments. There are several different methods of determining the location of the color stripe burst, either by knowing its location from prior analysis or by actual detection. Various embodiments are also disclosed herein for defeating the color stripe process. These, as described above, generally rely on first determining the video line locations of the color stripe bursts, either by knowing their location from prior analysis and programming in the location to e.g. a programmable memory, or by sensing each individual color stripe burst color burst on a video line-by-line basis. Either of these methods for determining the location of the color stripe burst may be achieved by various circuits.

As an alternative, one replaces all color bursts with correct phase bursts, generating the correct bursts by particular circuits different from that illustrated in Ryan U.S. Pat. No. 4,626,890 as disclosed below.

A typical circuit which relies on knowledge of the location of the color stripe burst (for the case of the color stripe burst video line-locations being stationary) generates vertical and horizontal timing signals from the input video signal and from these generates indicator signals indicating particular video lines in each video field and particular portions of the line for which it is desired to provide a modification to the color burst.

The detector approach typically uses a phase detector which includes a subcarrier regeneration circuit such as a phase lock loop, crystal filter or frequency multiplier circuit for determining the phase of the color burst, and then compares this detected phase to the nominal phase (using a phase comparator) and provides an indicator signal when the color stripe burst is present, i.e. when the color burst phase has been modulated to deviate from the normal (correct) phase. This indicator signal then controls the desired modification to that line.

The actual modifications to the video lines to defeat the color stripe process fall into two main categories. In the first category, the color burst itself is altered so as to defeat (eliminate or attenuate) its effect on a typical VCR. In the second category, the horizontal sync pulse immediately preceding a color stripe burst is altered, thus causing a VCR not to respond to the succeeding color stripe burst.

The first approach (in which the color stripe burst itself is modified) may be performed in several ways.

In one embodiment the color stripe burst is blanked out and not replaced. Alternatively, the color stripe burst is blanked out and a new color burst of correct phase inserted therefor. The color stripe burst alternatively is phase shifted so that it is corrected in phase.

In another embodiment, the color stripe burst is delayed in time with respect to the trailing edge of the preceding horizontal sync pulse, so that the color stripe burst occurs outside the detection window of the VCR color burst circuitry.

In another embodiment, the phase error (shift) present in the color stripe burst is measured and a color burst of a negative vector phase is added thereto, and then the summed color burst may be attenuated to a normal level. In another embodiment, a very large amplitude color burst of correct phase is added at the color stripe burst location and then the summed color bursts are attenuated to a normal level, thus effectively eliminating the effect of the color stripe burst. (This can be done on all video lines—those having color stripe bursts as well as non-color stripe burst lines.)

In another embodiment, a color burst of inverted phase (opposite to that of the color stripe burst) is added to substantially null out the color stripe burst, and then a color burst of correct phase is added in. In another related embodiment, the correct phase of a normal color burst is determined and the difference between the phase of that normal color burst and the phase of the color stripe burst is measured. Then a signal with a negative phase as to the difference is generated and used to modify the color stripe burst, to produce color bursts that are "swinging" in phase the same amount of degrees from the correct burst in alternate lines. That is, in an example, the color stripe burst phase is +45°. Then one modifies a sufficient number of TV lines with each color stripe burst having about half of the color burst having a phase of +90°, while changing the other half of the color burst to have a phase of −90° (the opposite phase angle). This swinging is averaged out by a typical VCR.

In another embodiment, all the color bursts of correct phase throughout the TV field are replaced with color bursts having the phase of the color stripe bursts or having some (arbitrary) chroma phase angle. Then the chroma phase of each corresponding TV horizontal line is modified to match the phase of the color stripe bursts or to be the arbitrary chroma phase angle.

It is to be understood that in each of these embodiments it has been found that it is not necessary to modify all of a particular color stripe burst; it has been found that modifying as little as one-half of a color stripe burst effectively eliminates its effect for a typical VCR. Also, it has been found that it is not necessary to modify each color stripe burst present in a video field; the typical VCR can make a copiable recording of a signal with as much as one-half of the original color stripe bursts still present for a typical commercial embodiment of the color stripe system.

Another embodiment which involves modifications to the color stripe burst itself heterodynes the color stripe burst signal into the correct phase. One can also use heterodyning to effectively blank out burst as seen by the VCR. This results for instance in heterodyning the color stripe burst to a new frequency to which the VCR will be non-responsive, i.e. a frequency substantially higher or substantially lower than the normal TV subcarrier frequency.

The other broad category of methods for defeating the color stripe process uses various modifications to the horizontal sync pulses preceding at least some locations of the color stripe bursts. If the VCR sync separator fails to sense a horizontal sync pulse, the VCR will not generate a burst sampling pulse and hence will not detect any subsequent color stripe burst. Thus it has been found that removing the horizontal sync pulse of a color stripe burst line results in a copiable video signal. Additionally, it has been found that actual removal of the horizontal sync pulse is not necessary; instead the horizontal sync pulse may be for instance attenuated in width (duration) by narrowing it to the point where the horizontal sync pulse is not detected by the corresponding sync separator circuitry in the VCR, and hence the succeeding color stripe burst is also not detected.

Also, it has been found that removing only some of the horizontal sync pulses coincident with the color stripe bursts reduces the effectiveness of the color stripe process. Other embodiments for modifying the horizontal sync pulse include DC level shifting upward of the horizontal sync pulse, thus causing the VCR sync separator to fail to produce an output signal.

Another embodiment relating to the horizontal sync pulses is to black clip or amplitude attenuate the horizontal sync pulses so that they are not sensed by the VCR's sync separator.

Another embodiment which also relates to the horizontal sync pulses adds a delay of about 2 microseconds between the trailing edge of the horizontal sync pulse and the beginning of the color stripe burst; thus the VCR color burst sampling pulse missamples the delayed color stripe burst and misses it.

It is to be understood that while the description herein generally refers to NTSC TV, with relatively minor modifications of the type well known to one of ordinary skill in the art the methods and circuits described herein are suitable for use with PAL TV, which similar to NTSC TV, has a color burst immediately following a horizontal sync pulse. The major differences between NTSC and PAL television, i.e. the number of lines per field and number of fields per second, are not material to the present invention and the circuits described herein may be readily modified to accommodate PAL TV.

BRIEF DESCRIPTION OF THE DRAWINGS

FIGS. 2A to 2G show waveforms illustrating various ways of defeating the color stripe process in accordance with the invention.

FIG. 3 shows a block diagram of an apparatus in accordance with the invention.

DETAILED DESCRIPTION

Figure 1A:
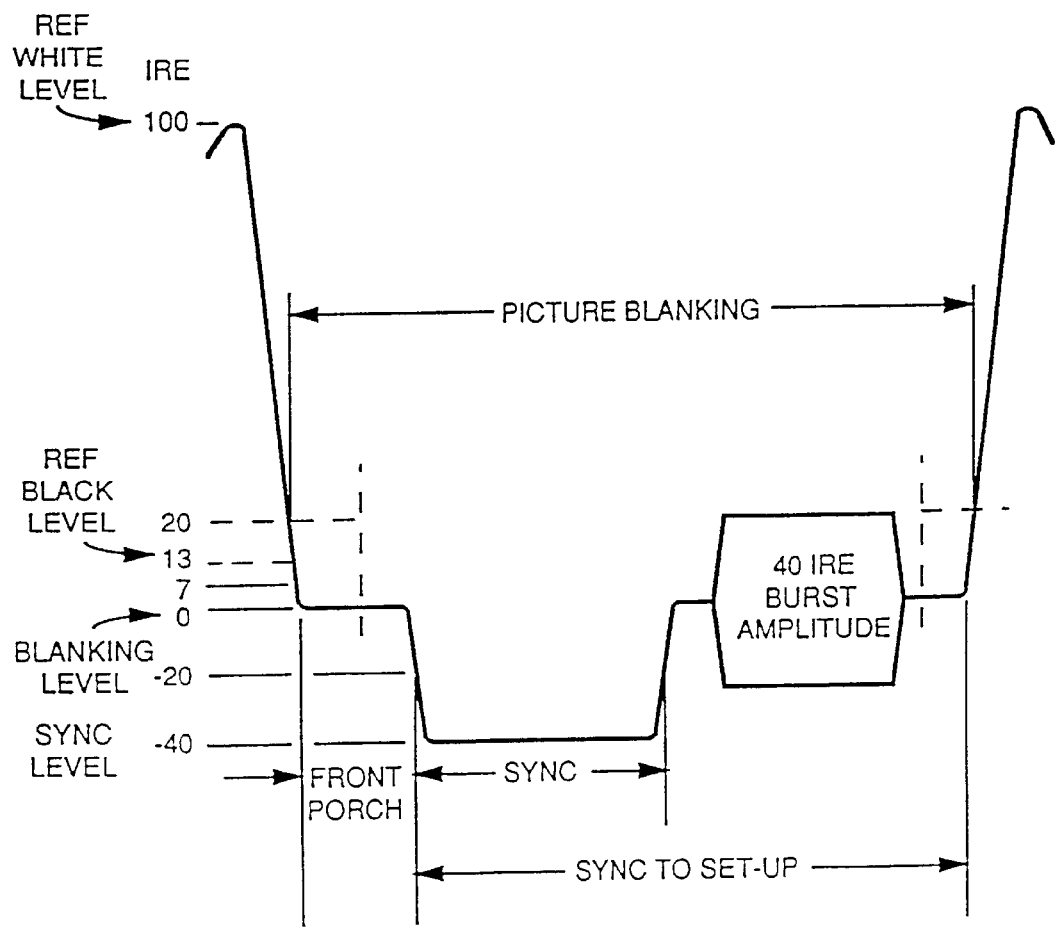
FIGS 1A and 1B show a standard NTSC TV waveform.
Figure 1B:
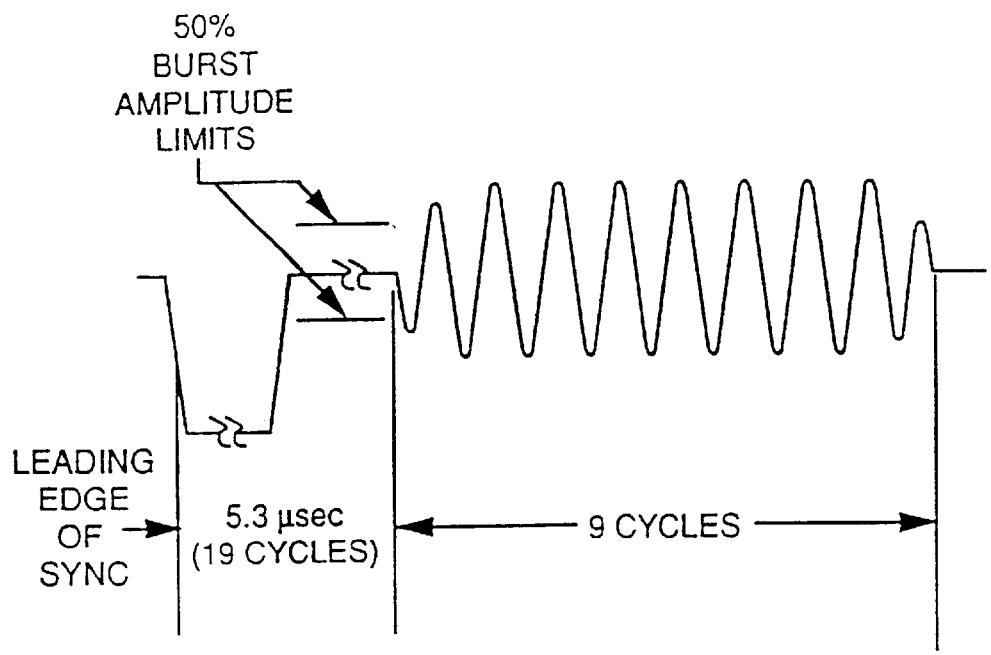

The following describes a number of embodiments to defeat the color stripe process. First is a description relating to waveforms and processes; second is a description of various related circuits.

Process Description

The following are various color stripe defeat processes in accordance with the invention.

1. One or more color burst phase lock loops (or other circuits) are used to find the mean color burst phase and then all color bursts (whether color stripe or not) are replaced throughout the video signal.

This replacement may be of only a portion of a particular color burst. For instance, of the standard eight to ten cycles of NTSC color burst, one may replace e.g. the first five cycles, the last five cycles, or any other group of e.g. four to six cycles. The replaced cycles need not be consecutive; one may replace alternate cycles, leaving "good" (corrected) cycles interspersed with "bad" (color stripe) cycles. It also is possible to add corrected color burst cycles outside of their normal location and overlying the horizontal sync pulses, since these will be detected by a VCR. It is to be understood that the recognition by the present inventors that only a portion of a particular color burst need be replaced forms a part of the invention. Moreover, the partial replacement is also applicable to other of the embodiments described hereinafter.

2. A crystal or horizontal line phase locked loop (or equivalent such as a burst crystal filter) supplies a signal whose frequency is a 455 or 910 (in NTSC TV) multiple of the horizontal line frequency and divided down to the color frequency, with phase reset of every field based on odd or even field identification. This color frequency is used to replace (in the sense described above) all or sufficient of the color stripe bursts to allow a copiable result.

3. A color phase lock loop is used to identify the specific horizontal video lines that are color striped, and then the color stripe burst is phase shifted (using e.g. a conventional phase shifter circuit) to obtain a usable recording.

4. Determine which are the color stripe horizontal lines, and coincident with these color stripe lines, switches in a phase shifted color burst to replace the color stripe bursts or all bursts.

5. Either sense the color stripe video lines (e.g. via a color phase lock loop) or identify color stripe video lines otherwise and delay each active video line and thus the chroma so as to provide a copiable signal.

6. Either sense the color stripe lines (e.g. via a color phase lock loop) or identify color stripe lines otherwise, and phase shift the chroma in the active lines where the color stripe process is located to make a copiable color stripe free tape. Phase shifting the chroma is accomplished by a conventional circuit such as an operational amplifier having its inverting terminal connected via a resistor to the input signal and its non-inverting terminal connected via a capacitor to the input signal. The input terminal of its operational amplifier is connected to the inverting terminal via a resistor, and also a resistor of the same value is connected to the inverting input terminal of the operational amplifier and its output.

7. Locate video lines in which the color stripe bursts occur, then measure the color stripe burst phase error. This is done with a phase detector with the color stripe burst as one input and a color subcarrier regeneration circuit (e.g. a color crystal ringing circuit) supplying the second input. Then a color burst of a negative vector phase is added to correct the burst phase and (in one version) readjust the burst amplitude to a normal level of e.g. 40 IRE units.

8. Locate video lines in which the color stripe bursts occur, then effectively replace the color stripe bursts by adding a very large amplitude of the correct color burst to the color stripe burst and then attenuate the resultant summed burst, thus effectively eliminating any effect of the incorrect color stripe).

9. Replace the color stripe bursts by first locating the color stripe bursts, then adding color bursts of an inverted phase to substantially null out the color stripe bursts and adding in color bursts of correct phase. This requires ascertaining the phase of the color stripe bursts, by observation or by measurement as above. This process results in replacement of the color stripe bursts, without having to switch the bursts out.

10. Use a color frequency phase lock loop (or other method) to find the correct phase of a normal color burst signal and to find the phase difference between the normal color burst and the color stripe burst signals. Using this information, generate a signal with a negative phase of this difference and use this signal to modify all or part of the color stripe burst with the negative phase burst signal to produce color bursts that are swinging in phase the same amount of degrees from the correct burst from one line to the next line or within the portions of burst in the same lines. A VCR tends to average the TV line to next line swinging plus or minus phase burst signals, and/or the plus/minus burst phase portions within each TV line. Therefore the resulting signal tends to produce less hue errors than does the unmodified color stripe signal.

Figure 1C:
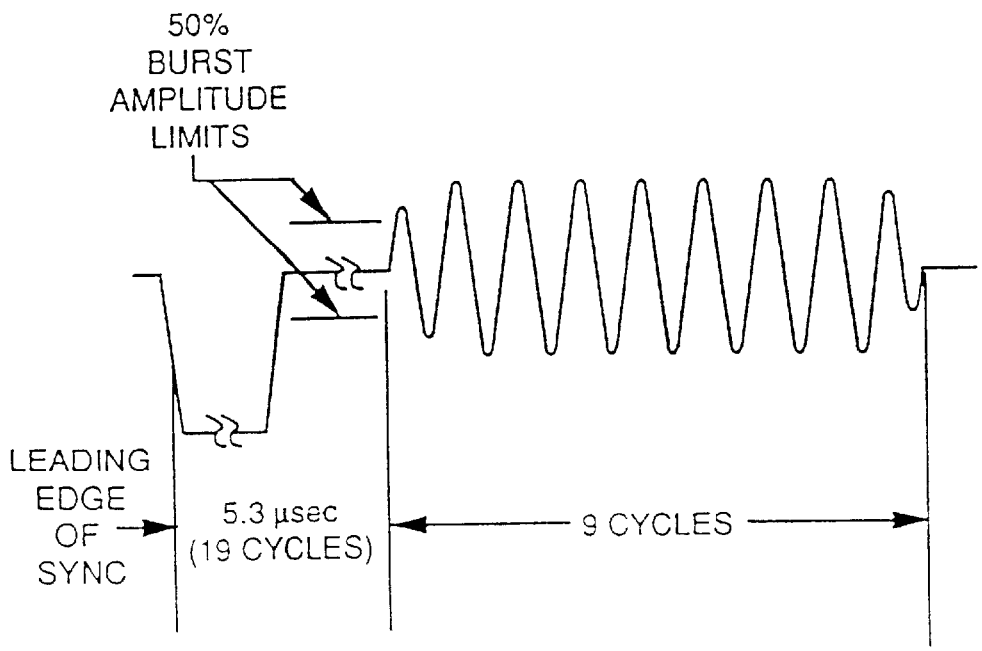
FIG. 1C shows a modification to the waveform of FIG. 1B thereby illustrating the color stripe process.

Variants of the above described methods are illustrated in FIGS. 2A and following. FIG. 2A illustrates (in simplified form) the horizontal sync pulse and color stripe burst of FIG. 1C. The hatched area is the color stripe burst area; the individual color burst cycles are not shown here for simplicity. In the case of FIG. 2A, the entire color burst is phase shifted as indicated by the hatching.

One method to defeat the color stripe process is illustrated in FIG. 2B, wherein a portion (here the right hand or later portion) of the color stripe burst is modified to be in correct phase and/or negative color stripe burst phase, as illustrated by the absence of hatching. As described above, it has been found that if about half or more of the duration of the color stripe burst has its phase corrected or is blanked, the color stripe burst is effectively defeated. That is, the NSTC color burst is 8 to 10 cycles long; it has been found that modifying 4 to 6 of these cycles is adequate.

FIG. 2C shows another method to defeat the color stripe process; here the central portion of the color stripe burst is blanked. The first and second portions are corrected to the correct phase; this shows that the entire color stripe burst need not be present in order to achieve proper color functioning of the VCR and/or television set.

FIG. 2D shows a variant of FIGS. 2B and 2C, where the first and last portions of the color stripe burst have their phase corrected, but the central portion remains with the incorrect phase. As shown here approximately 30% or 40% of the color burst remains at the incorrect phase but this still effectively defeats the color stripe process.

In FIG. 2E the entire color stripe burst has been blanked with no substitution provided. In this case it has been found that there is no need for a color burst in each and every video line for effective functioning of most television sets and VCRs.

In FIG. 2F the first portion of the color stripe burst has been blanked; instead a few cycles of color burst of correct phase are overlaid on the actual horizontal sync pulse. Even at this location they will be detected by the color synchronization circuitry of the TV set or VCR. A portion of the color stripe burst is still present i.e. the central portion; the last portion of the color stripe burst has its phase corrected to be normal.

FIG. 2G shows a last and obvious variant wherein the entire color stripe burst has its phase corrected, by replacing or altering the color stripe burst to be of correct phase.

Other defeat methods include those that relate to the horizontal sync pulses:

11. Replace all correct phase color bursts throughout the TV field with color bursts having the phase of the color stripe bursts. Then modify each corresponding active horizontal TV line's chroma phase to equal that of the color stripe bursts. For example, if the color stripe burst phase is 180° off from the correct color burst phase, then one modifies the correct color burst phase color burst by 180°. One can also replace all color bursts with bursts having an arbitrary phase, and then phase shift the chroma phase in the active portions of the TV lines to be equal to the arbitrary phase.

This modifying can be done by phase shifting and/or delay circuits and/or inverting amplifiers. With this modification, the chroma phase in each TV horizontal line is 180° off from that of the modified burst as described above. To correct this discrepancy, one then modifies each of the TV horizontal active lines by phase shifting its chroma by 180°. This can be done by switching in a phase shifted or delayed version of the original video active horizontal TV lines in conjunction with the modified color burst. Again one can obtain a copiable recording by modifying a sufficient number of correct color bursts and phase shifting a sufficient number of TV horizontal lines.

12. Remove the horizontal sync pulse such that the VCR burst detection circuit (which usually relies upon a preceding horizontal sync pulse) is disabled. One can effectively "remove" horizontal sync pulses several ways. For instance, one can remove the horizontal sync pulses immediately preceding at least some locations of the color stripe burst. It has been found that removing e.g. four horizontal sync pulses coincident with a band of color stripe burst video lines results in a copiable recording without adversely affecting the horizontal line timing of the VCR. Removal of these horizontal sync pulses can also be done by narrowing the horizontal sync pulse coincident with the color stripe burst lines. This narrowing is done until the color stripe effectiveness is reduced to the point it is possible to make a copiable recording. As an example, one may reduce the horizontal sync pulses down to 100 nanoseconds width. It has also been found that removing only some of the horizontal sync pulses coincident with the color stripe burst lines reduces the effectiveness of the color stripe signal. For example, every other line where a color striped burst occurs, the horizontal sync pulse is removed from that line.

13. DC level shift upward the horizontal sync pulses preceding the color striped bursts. This causes the VCR's sync separator to fail to produce an output in response to these level-shifted horizontal pulses.

Other methods to effectively remove the horizontal sync pulses are to black clip or amplitude attenuate them to about 20 IRE or less so that the VCR's sync separator will not sense these smaller amplitude horizontal sync pulses, and thus not create a burst sampling pulse, when color stripe bursts are present.

These last two methods may lead to "playability" problems, due to the missing horizontal sync pulses. "Playability" refers to the resulting video signal including significant visual defects due to "slicing" off of active video as caused by improper horizontal sync pulse separation. This causes some sync separators in televisions receivers or VCRs to generate false horizontal synchronizing pulses. To minimize such playability problems one can:

Add a pedestal voltage or signal such as a ramp of 0 IRE at the beginning of the active TV line to about 10 IRE at the end of the TV line to all active TV lines; and/or widen all other horizontal sync pulse widths to about 6 microseconds.

14. In video lines where color stripe bursts are present, add a delay of about 2 microseconds or more such that the VCR's burst sampling pulse (triggered by the horizontal sync pulse) between the trailing edge of the horizontal sync pulse and the beginning of the color strip burst missamples (misses) the delayed color stripe burst.

15. Heterodyne the color stripe burst signal into the correct phase by mixing it with a signal such that the resultant has the correct phase.

16. Heterodyne the color stripe burst to a new frequency such that the VCR will be non-responsive to it. For example, the color stripe burst could be shifted by heterodyning it to a 15 MHz signal or a 2 MHz signal.

In any of the above embodiments, one may replace the color phase lock loop with at least one stage of crystal filtering such as a ringing circuit.

General Circuit

FIG. 3 shows a block diagram of an apparatus in accordance with the present invention suitable for carrying out the above-described methods for defeating the color stripe process. An input video signal "video in" is typically provided from a cable television source, but possibly from other sources such as pre-recorded video tape. (However, the color stripe process is generally not suitable for pre-recorded video tape.) The input video signal is provided to a circuit including a color stripe location memory 12. This is typically a programmed read only memory. e.g. an EPROM, which includes data indicating on which of the 525 lines of the NTSC television field the color stripe bursts are located. This EPROM is programmed prior to assembly of the circuit, and the knowledge of the location of the color stripe burst is determined by observation. Therefore it might be determined that the color stripe pattern is the commercial embodiment as described above with four video lines having the color stripe burst followed by eight video lines without the color stripe burst, etc. The output signals of the color stripe location from the memory 12 include a line location gate (LLG) signal indicating on which lines the color burst is located. The LLG signal is thus high for the entire duration of a line having a color stripe burst.

A second output signal from the color stripe location memory 12 is a pixel location gate (PLG) signal which indicates in exactly which portions of the color burst are to be modified. The LLG signal is useful because as explained above in certain embodiments of the invention only a portion of each color burst is modified and other portions are not. Thus typically the PLG signal is high for only a portion of a color stripe burst, but it may of course be high for the entire duration of a color stripe burst where it is desired to modify and/or eliminate the entire color stripe burst.

Again, the data to generate the PLG signal is stored in a part of memory 12 which stores enough data to divide up the color stripe burst into e.g. 20 segments and to modify or not modify each of those segments. Since the color burst in NTSC television is eight to ten cycles in duration, each of these cycles may be treated individually by the PLG signal.

An oscillator 16 provides an output signal having the subcarrier frequency signal (3.58 MHz for NTSC). This oscillator (timing signal generator) may be for instance a phase lock loop, or a crystal filter oscillator, or may derive the subcarrier frequency from the frequency of the horizontal sync pulse edges and then multiply the horizontal sync pulse frequency by frequency multipliers or by a phase lock loop to cause the circuit to lock on to the correct color subcarrier frequency.

A phase detector circuit 18 provides an output signal which is either logically high or low and is called the color stripe detector (CSD) signal. Thus when the signal is high it indicates that the color stripe burst has been detected in a particular video line. This CSD detection signal is useful when the video line locations of the color stripe bursts are not known. This is typically used where the color stripe burst locations are dynamic, i.e. not stationary. Thus use of the phase detector is an alternative to the use of the LLG signal and they are typically not both used in a single circuit. Thus the circuit of FIG. 3 is a generalized representation of several alternative circuits sharing common elements and shown here as one circuit for purposes of explanation.

The phase detector circuit 18 includes a phase detector, the output signal of which is provided to a comparator to compare the phase of a particular color burst to that of a normal color burst. If the comparison indicates no difference, then the color stripe detector signal is low, i.e. there is no color stripe burst present; if there is a difference, then the color stripe detector signal is a high signal indicating the presence of a color stripe burst.

The right hand portion of FIG. 3 shows a generic modification circuit 22. This circuit 22 may be any one of a number of circuits, each of which performs one of the types of modification to the video signal as disclosed above and is described in detail hereinafter. In addition to receiving as inputs the indication of the presence of the color stripe, i.e. either the LLG signal or the CSD signal, and the PLG signal indicating which portions of the color stripe are to be modified as well as the subcarrier frequency signal, the modification circuit also receives the input video signal.

The output signal of the modification circuit 22 is a video signal "video out" which is free of (or has only an attenuated) color stripe process and hence is copiable by a typical commercially available VCR.

As described further below, the modification circuit either attenuates or eliminates the color stripe process by direct modification of the color stripe burst or alternatively operates on the horizontal sync pulse immediately preceding a color stripe burst, and by modifying the horizontal sync pulse causes the VCR to ignore the ensuing color stripe burst.

Therefore by logically ANDing the output of the phase detector (the CSD signal) or the LLG signal with the PLG signal, one may select which video lines to modify and which portion of each line is to be modified. As described above, it has been found generally that it is adequate for instance to modify as little as half of a particular color stripe burst in order to defeat the color stripe process as regards that color stripe burst. Moreover, it has been found experimentally that for typical commercial embodiments of the color stripe process one may modify or eliminate as few as one half of the color stripe bursts and still effectively defeat the color stripe process, i.e. provide a copiable video signal. It is to be understood that herein the terms "copiable" and "recordable" both mean that the resulting video signal, when recorded by a VCR and then played back, provides a viewable television picture without substantial hue defects due to the color stripe process. Thus these terms refer to effective elimination (defeat) of the effect of the color stripe process in terms of viewability of the video signal.

Exemplary Circuits

Figure 4A:
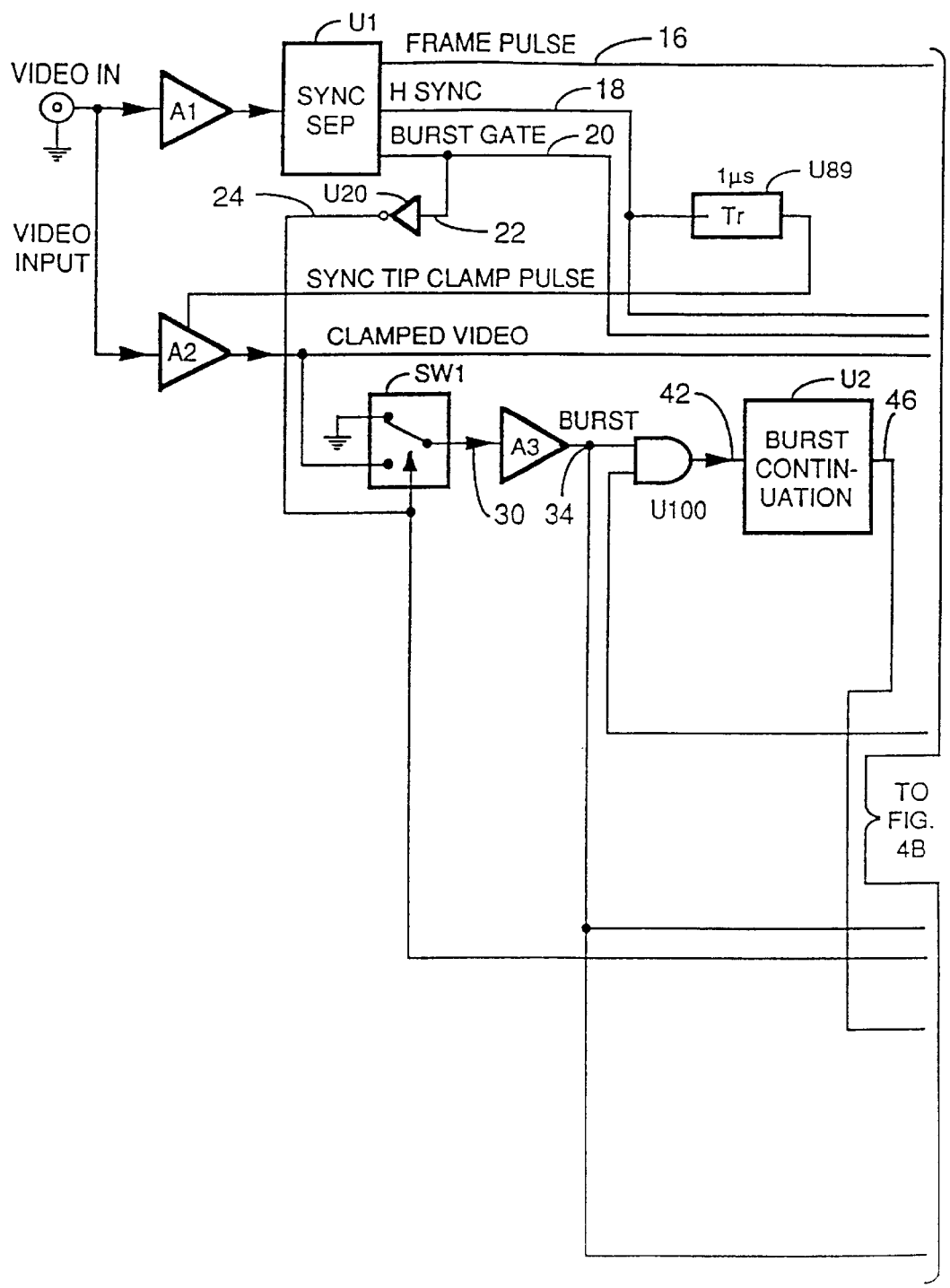
FIGS. 4A to 4C show circuits for generating a correct color subcarrier frequency and other signals to defeat the color stripe process.
Figure 4B:
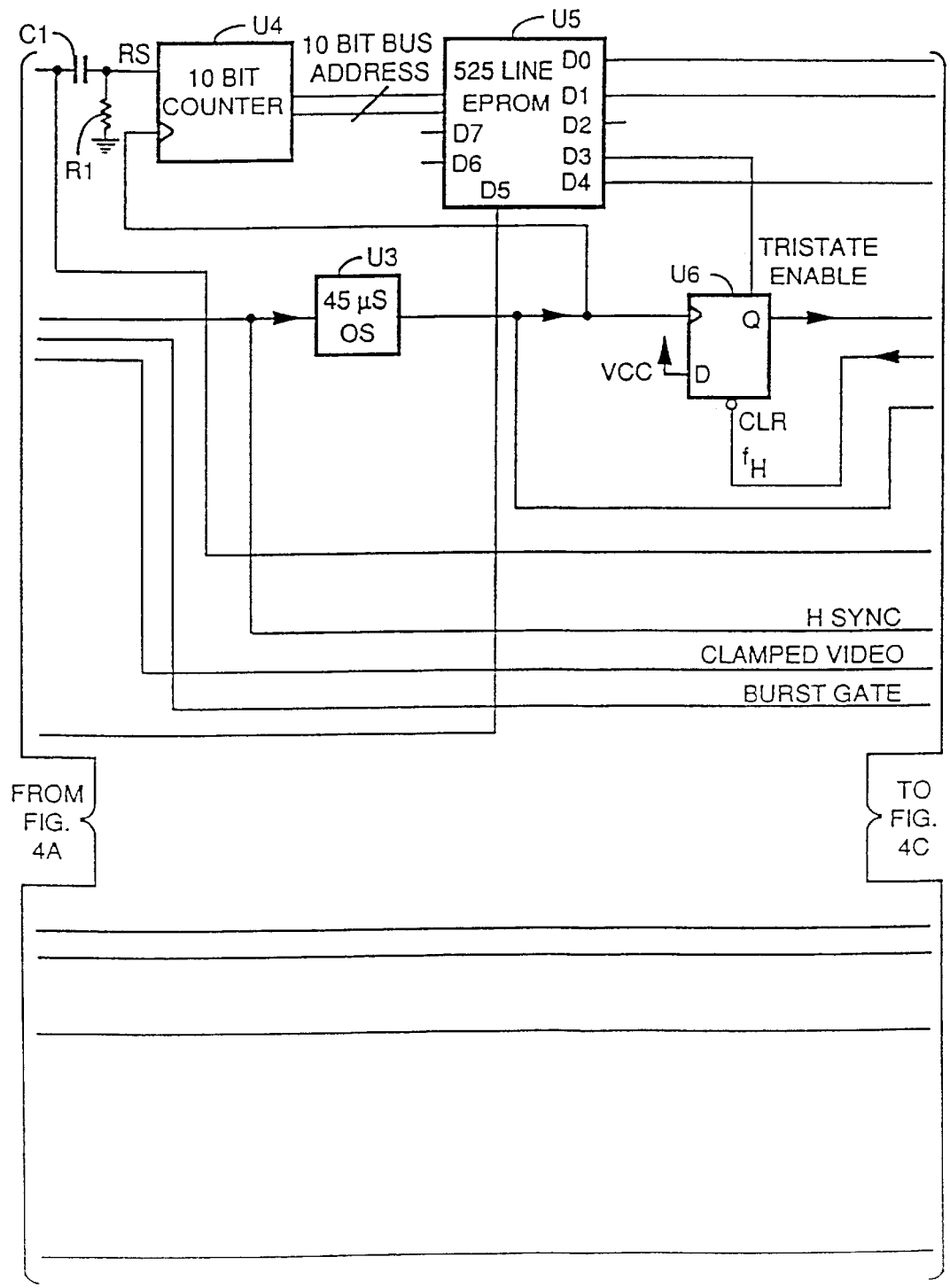
Figure 4C:
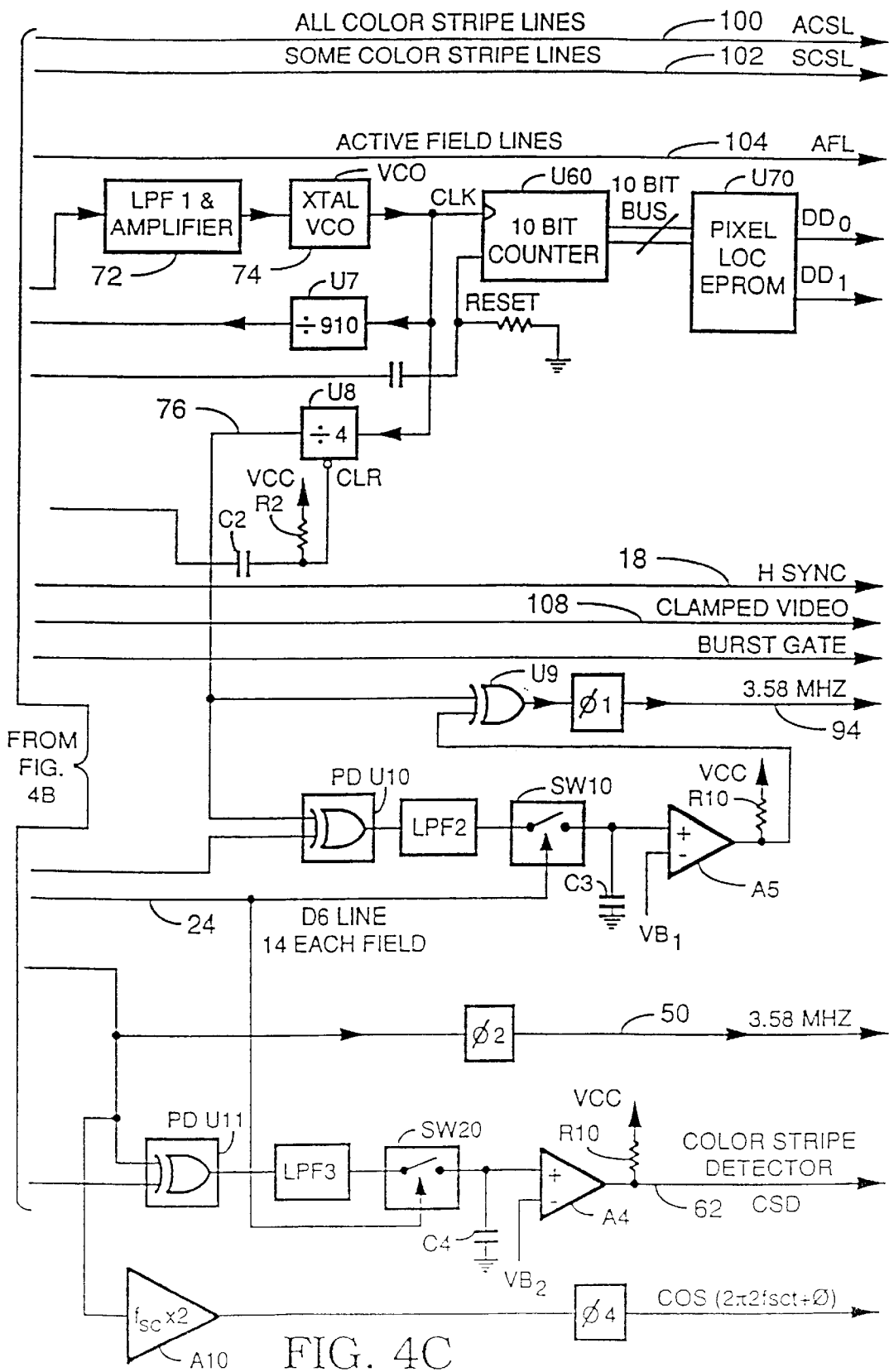

FIGS. 4A, 4B, 4C illustrate several exemplary circuits for generating the correct color subcarrier frequency and other signals to be used to replace the color burst signal component in the output video of the device. FIG. 4C also illustrates a circuit for generating timing signals to defeat the color stripe process to provide a copiable video signal therefrom. Thus FIGS. 4A, 4B, 4C and FIGS. 5A, 5B, 6A, and 6B show various particular versions of the circuit of FIG. 3.

Copy protected video from a video source (such as cable television) is conventionally demodulated (not shown) to produce baseband video using well known techniques. This copy protected video usually contains stable video with horizontal and vertical sync and subcarrier coherency, and includes the color stripe process as described above. The copy protection may also include pseudo-sync and AGC pulse pairs as described in the above-referenced U.S. Pat. No. 4,631,603 to Ryan and raised back porch pulses as described in U.S. Pat. No. 4,819,098 also to John O. Ryan and incorporated herein by reference. These pseudosync and AGC pulse pairs may be removed using the techniques described in U.S. Pat. No. 4,695,901 to John O. Ryan and also incorporated herein by reference. Also incorporated by reference are U.S. Pat. No. 5,194,965 to Quan et al., U.S. Pat. No. 5,157,510 to Quan et al., and U.S. patent application Ser. No. 08/062,866 filed by Wonfor et al which also disclose copy protection and defeat techniques relevant to the present invention.

This baseband video in signal (see FIG. 4A) is input to amplifiers A1 and A2. The output of amplifier A1 is coupled to sync separator U1 which is e.g. National Semiconductor Corp. part number LM1881 or equivalent Sync separator U1 generates a frame pulse on line 16, a horizontal sync pulse on line 18, and a burst gate signal on line 20. Amplifier A2 operates as a sync tip clamping amplifier. One-shot U89 generates a sync pulse sample pulse to cause amplifier A2 to be clamped at sync pulses to a specific voltage, i.e. −40 IRE.

Sync tip clamping is desirable since the input signal may include the above described pseudo-sync and AGC pulses which would cause back porch clamp circuits to behave incorrectly. The output signal of Amplifier A2 is about 1 volt peak-to-peak and the blanking level of the video output signal of amplifier A2 is clamped to about zero volts. Burst gate inverter U20 is coupled to the control terminal of switch SW1. The clamped video signal from amplifier A2 is coupled to a first input of switch SW1 and to the "Clamped Video" output line of FIG. 4C. The second input terminal of SW1 is coupled to ground.

Switch SW1 gates out the color burst portion of the input video to produce a gated color burst signal on line 30. Chroma amplifier A3 amplifies the gated color burst signal on line 30, and its output terminal 34 is coupled to a first input terminal of AND gate U100. The other input terminal of gate U100 is connected to the D5 Output terminal of EPROM US (see FIG. 4B). EPROM US 38 is a 525 line EPROM discussed more fully later; its D5 output terminal provides a signal that is typically high during the active field and low during the vertical blanking interval. It is necessary for the signal at terminal D5 to be "on" during the entire active TV field since it can be programmed to be on during the time of normal color burst signal and/or be low during the time during the time of color stripe bursts and/or low during vertical blanking interval (VBI) lines without color burst. The output signal from gate U100 on line 42 is bursts from the input video, with possible restrictions to particular lines in the VBI.

Color burst phase lock loop U2 has a slow and long time constant in its DC amplifier such that its output signal is phase constant, even though color stripe bursts with incorrect phase burst signals are present in the video input 42. PLL U2 may alternatively may be a crystal burst continuation oscillator that is injection locked, such as the RCA CA1398, or a burst ringing circuit such as a crystal filter. The output terminal 46 of PLL U2 is coupled to a phase shifter φ2. The output signal of phase shifter φ2, on line 50 is a stable 3.58 MHz sine wave CW2 that is used in the circuitry of FIGS 5A, 5B to produce recordable video signals.

The above discussion assumes that the locations of the color stripe bursts are known and fixed. If the location of the color stripe bursts is moving in line location over time, these color bursts instead are detected on a line-by-line basis. This detection is done by comparing the input video burst signal to gate U100 with the output signal of circuit U2 using phase detector (PD) U11 (see FIG. 4C). The output signal of phase detector U11 is coupled to 3 MHz low pass filter (LPF) LPF3 to an input terminal of switch SW20. Switch SW20 is controlled by an inverse clamp pulse on line 24. Switch SW20 and capacitor C4 sample and hold the output of the 3 Mhz low pass filter LPF3 during the burst gate interval. The non-inverting input signal to amplifier A4 hence is a line-by-line identification of the burst phase. An incorrect burst phase from a color stripe signal causes a different voltage to appear at the input terminal of amplifier A4 than when the correct burst phase occurs. Amplifier A4 operates a threshold detector that triggers high when color stripe bursts are present. The output signal of amplifier A4 hence is a color stripe detection signal (CSD) on line 62 that is used in the circuitry of FIGS 5A, 5B to produce copiable signals.

A second method to generate a stable color subcarrier is to derive a subcarrier signal from the horizontal sync portion of the video signal. This method is applicable when there is sync-to-burst coherence, which is the case when the color stripe process is applied in cable television applications. To achieve this, a horizontal sync pulse signal on line 18 from sync separator U1 is coupled to a 45 microsecond non-retriggerable one shot U3 to eliminate the horizontal sync pulses present during the vertical interval and/or the pseudo sync pulses when both are in the video input signal.

The output terminal of one shot U3 (see FIG. 4B) is coupled to a first input terminal of a 10 bit counter U4. The reset input terminal of counter U4 is coupled to a frame pulse output terminal of sync separator U1 by way of line 16 and a differentiation circuit including capacitor C1 and resistor R1. The output signals of 10 bit counter U4 feed a 10 bit bus to EPROM circuit US. EPROM US is programmed to set high or low logic levels within the TV frame (525 lines in NTSC). The output terminals of EPROM US are D0 to D7. The signal on terminal D3 can be high all the time or high during a portion of the TV field. The signal on terminal D3 controls the tri-state control of the flip-flop U6 Q output. One shot U3's output terminal is coupled to the clock input terminal of phase detector flip-flop U6. Horizontal sync edges from one shot U3 set flip flop U6, while the output signal of divider U7 resets flip flop U6. The output terminal of flip flop U6 is coupled to low pass filter and amplifier LPF1 for filtering and amplification (see FIG. 4C). The output of filter LPF1 is coupled to a crystal voltage controlled oscillator VCO operating at 14.318180 MHz.

As a result of the input signal from filter LPF1, oscillator VCO is locked to the video horizontal sync pulses. The output terminal of oscillator VCO is coupled to divide-by-4 counter U8 to produce a subcarrier frequency signal on line 76. The divide-by-4 counter U8 is reset at its CLR terminal every frame and results in a 0° or 180° ambiguity in the correct phase of subcarrier frequency on line 76. To correct this, the signal of divide-by-4 counter U8 is phase compared by phase detector U10 with the normal burst of the input by sampling at a video line known to have a normal burst, i.e.

video line 14, and holding via capacitor C3. If the phase is correct from counter U8, amplifier AS outputs a low state and the output of exclusive OR gate U9 will not invert the phase of the output signal of counter U8. If the phase of the output signal of counter U8 is incorrect (180°), phase detector (PD) U10 supplies a voltage (via low pass filter LPF2 and switch SW10) to amplifier AS such that the output of AS amplifier is high. This then causes the output of XOR gate U9 to invert phase by 180°.

Switch SW10 is controlled by the signal at terminal D6 of EPROM U5.

This circuit generates the correct subcarrier phase at the output terminal of XOR gate U9. The output signal of XOR gate U9 is coupled to phase shifter φ1. The output of φ1 is a 3.58 MHz subcarrier signal CW1 on line 94 that is used in the circuitry of FIGS. 5A, 5B to generate one or more recordable output signals.

Additional circuitry in FIG. 4C includes 10 bit counter U60, the output terminals of which are coupled to horizontal line pixel location EPROM U70. Individual pixels are located by resetting the 10 bit counter U60 with horizontal rate edge signals from the output terminal of one shot U3 and clocking 10 bit counter U60 with the output signal of oscillator VCO. The 10 bit bus output signals of 10 bit counter U60 are coupled to the address lines of EPROM U70 to generate outputs DD0 TO DD7. These outputs (pixel location gate signals) represent pixel locations within the horizontal lines throughout the video field.

Figure 5A:
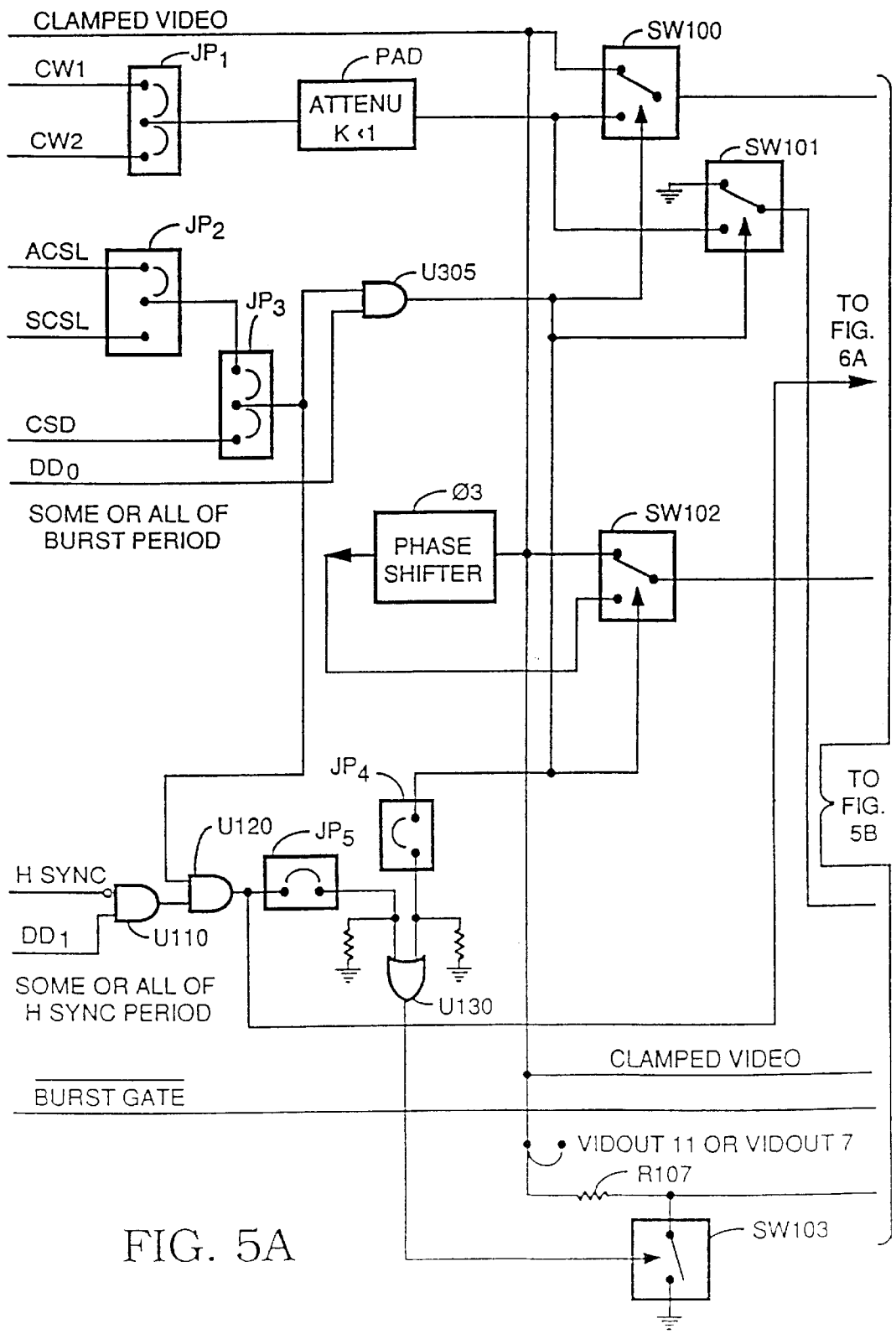
FIGS. 5A and 5B and 6A and 6B show various circuits to defeat the color stripe process.
Figure 5B:
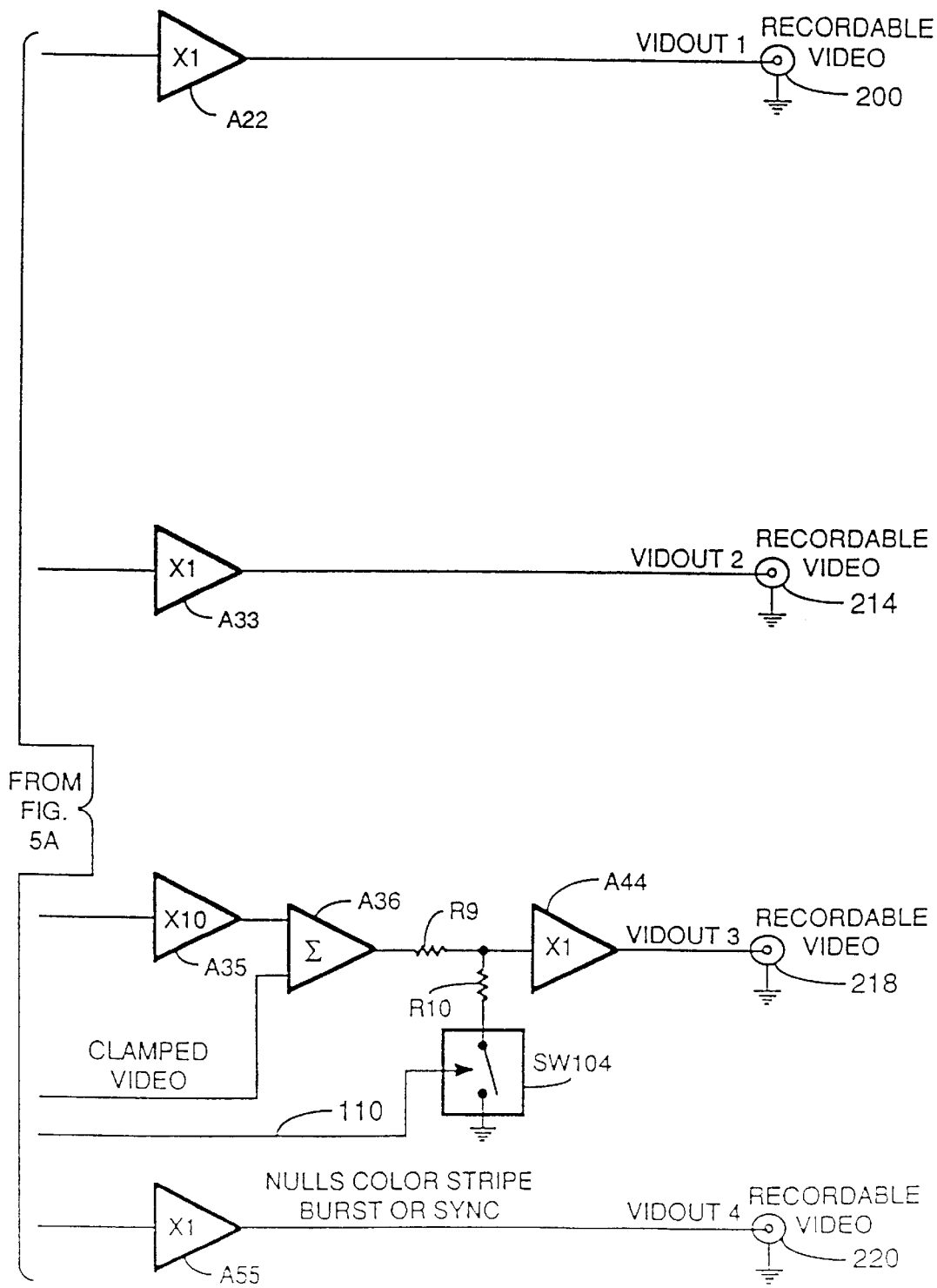

In addition to the FIG. 4C output signals discussed above, several additional output signals from FIG. 4C are used in the circuitry of FIGS. 5A, 5B. A first group of these include: (1) the D0 output signal of EPROM U5 which provides an "all locations" indication of color stripe pulses designated ACSL on line 100; (2) the D1 output signal of EPROM U5 which provides a "some location" indication of color stripe pulses designated SCSL on line 102; and (3) the output signal at terminal D4 of EPROM U5 which provides an "all active field" output designated AFL on line 104. These signals correspond to the line location gate signal of FIG. 3.

Additionally, there is: (1) a horizontal sync HSYNC output signal provided on line 18 by the horizontal sync output terminal of sync separator U1; (2) a CLAMPED VIDEO output signal on line 108 provided by the output terminal of clamp amplifier A2; and (3) a BURST GATE output signal provided by a burst gate output terminal 20 of sync separator U1. All of these output signals are used for various parts of the circuitry described in FIGS. 5A, 5B, 6A, 6B.

FIGS. 5A, 5B and 6A, 6B show various exemplary circuits to use the color subcarrier and other signals generated in FIG. 4C for various methods to produce a video output signal recordable by a videocassette recorder. Hence FIGS. 5A, 5B and 6A, 6B are illustrative of various possible circuits; an actual circuit hence would only include selected portions of what is shown in FIGS. 5A, 5B and 6A, 6B.

The first of these circuits produces a copiable video output signal VIDOUT 1, at terminal 200. The user can select a suitable subcarrier signal generated in FIG. 4C by selecting either the signal CW1 on lines 94 or signal Cw2 on line 62 using a jumper JP1. The output terminal of jumper JP1 is coupled to an attenuator PAD which attenuates the selected subcarrier signal. Clamped video on line 108 and attenuated subcarrier from the attenuator PAD are coupled to the first and second inputs of switch SW100. Switch SW100 is controlled by an output terminal of AND Gate U305, with one input terminal of gate U305 coupled to output line DDo of EPROM U5 carrying a burst gate signal of a width depending of the programming of the EPROM U5. The other input terminal of AND gate U305 is selectively connected to the ACSL signal on line 100, the SCSL signal on line 102 or the CSD signal on line 62 using a combination of jumper JP2 and jumper JP3.

This circuit permits the user to select video lines of the recordable video output VIDOUT 1 at terminal 200 which are to receive replacement color burst signals. If the ACSL signal is selected, the recordable video output VIDOUT 1 includes corrected color bursts on all video lines where color stripe burst are known to be. If the SCSL signal is selected, the recordable video output VIDOUT 1 includes corrected color bursts on a sufficient number of video lines to substantially reduce or nullify the effects of the color strip process on the recorded video.

The ACSL signal is preprogrammed and indicates the video lines which as determined by observation have in turn been preprogrammed by the color stripe generator. (The color stripe generator is the apparatus, not illustrated here, that puts the color stripe process into the video signal.) In some cases it is not known which lines have been preprogrammed, and then the CSD Signal is used to determine which video lines need to have color burst corrected. If the CSD signal is selected using jumper JP3 to drive AND Gate U305, the circuit replaces all or at least a majority of the color stripe burst in the recordable video output VIDOUT 1, such that the effects of the color stripe bursts are essentially nullified.

In each of the above techniques, the signal on the DDo output terminal of EPROM U5 is programmed to switch in enough of a portion of the correct burst in each line to substantially reduce or nullify the color stripe process.

A second circuit produces a recordable video output signal VIDOUT 2, at terminal 214. This circuit switches in a phase shifter during the video lines where a color stripe burst is known, to shift the known phase error of the color stripe burst. A first input signal to switch SW102 is clamped video on line 108 which contains color stripe bursts with a known value of phase shifted color burst signals. The second input signal to switch SW102 is the output signal of phase shifter φ3, which is a phase shifted version of the clamped video signal. The control terminal of switch SW102 is connected to the output terminal of AND gate, U305 which provides the same switching pulses as does control switch SW100. These pulses permit selection of enough of a corrected color burst of essentially the correct phase in each line to substantially reduce or nullify the color stripe process.

A third circuit for providing a copiable video output signal adds in a large amplitude of a correct burst signal to the color striped video and then attenuates the resultant burst to nominal burst levels. This circuit is accomplished as follows.

The clamped video signal on line 108 is coupled to a first input terminal of summing amplifier A36. The color subcarrier signal selected by jumper JP1, either signal CW1 or Cw2, via attenuator PAD is coupled to an input terminal of switch SW101. Switch SW101 selects the attenuated color subcarrier, that is at normal burst amplitude, during the times determined by EPROM U305 as discussed above. The output terminal of switch SW101 is coupled to amplifier A35, which is a 10× amplifier producing a color subcarrier burst signal 10 times the normal amplitude.

This amplified color burst signal is coupled to a second input terminal of summing amplifier A36, where it is summed with the clamped video signal on line 108 containing color stripe bursts. The output terminal of summing amplifier A36 is coupled to a switched attenuator including resistor R9, resistor R10 and switch SW104. Switch SW104 is controlled by the burst gate signal from sync separator U1 at line 20 on line 110. Closing switch SW104 230 attenuates the output signal of amplifier A36 during the duration of the burst gate signal. This in effect "swamps" any color stripe bursts present in the input video signal. The output of the switched attenuator is coupled to amplifier A44, which is a unity gain amplifier, to provide copiable video output VID-OUT 3 at terminal 218. Note that switch SW104 which causes the burst amplitude reduction can be closed during some or all of the color stripe lines and also during a portion of the color burst in each line to produce a recordable (copiable) signal. Note also that the addition of a large amplitude color burst via amplifier A36 followed by burst amplitude reduction can be done a majority of the video lines in a video field to produce a recordable signal.

A fourth technique for providing a copiable video signal includes removing the color stripe burst and/or the horizontal sync pulses preceding the color stripe bursts. By doing this, the recording VCR will not try to heterodyne correct the color stripe burst line with an incorrect phase burst signal. All or some of the lines with color stripe bursts that have horizontal sync pulses or color stripe bursts blanked out results in a recordable copy. It should be noted that only some of the relevant horizontal sync pulses are narrowed or only some of the relevant color stripe bursts are narrowed to produced a recordable output.

A circuit for implementing this fourth technique is as follows. Clamped video on line 108 is coupled to resistor R107 which in turn is coupled to unity gain amplifier A55. A combination of NAND Gate U110, AND Gate U120, jumper JP5, jumper JP4, and OR Gate U130 provides the timing signals to blank out color stripe burst and/or the horizontal sync pulses preceding the color stripe bursts. Switch SW103 grounds the input terminal of unity gain amplifier A55 whenever the selected pulses or burst intervals are selected by the elements outlined above. The timing components described above may blank out the horizontal pulses or color stripe burst signals during all or only during a portion of a color stripe burst period or its accompanying horizontal sync pulse. The output terminal of unity gain amplifier A55 provides recordable video output VIDOUT 4 at terminal 220.

Figure 6A:
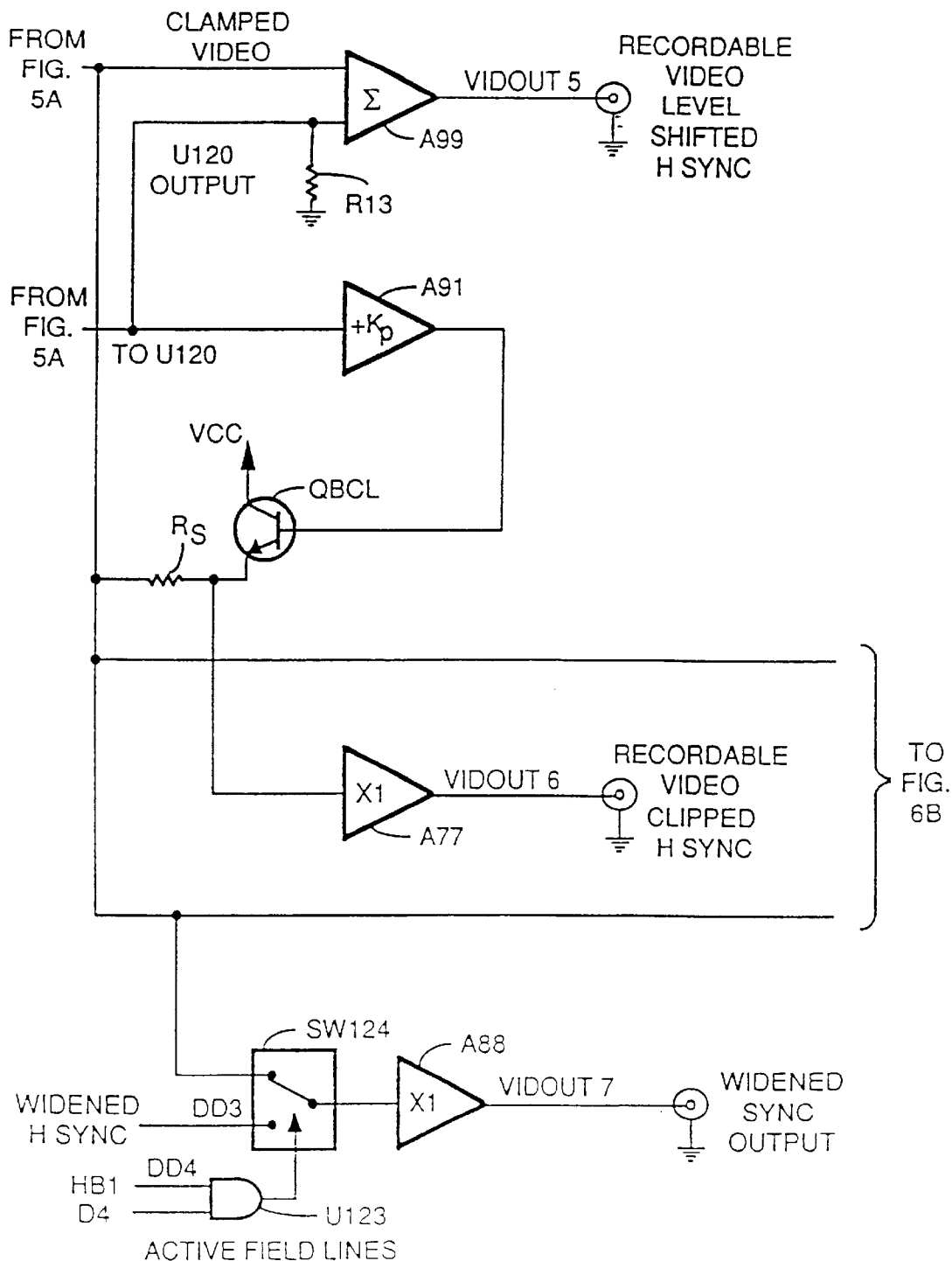
Figure 6B:
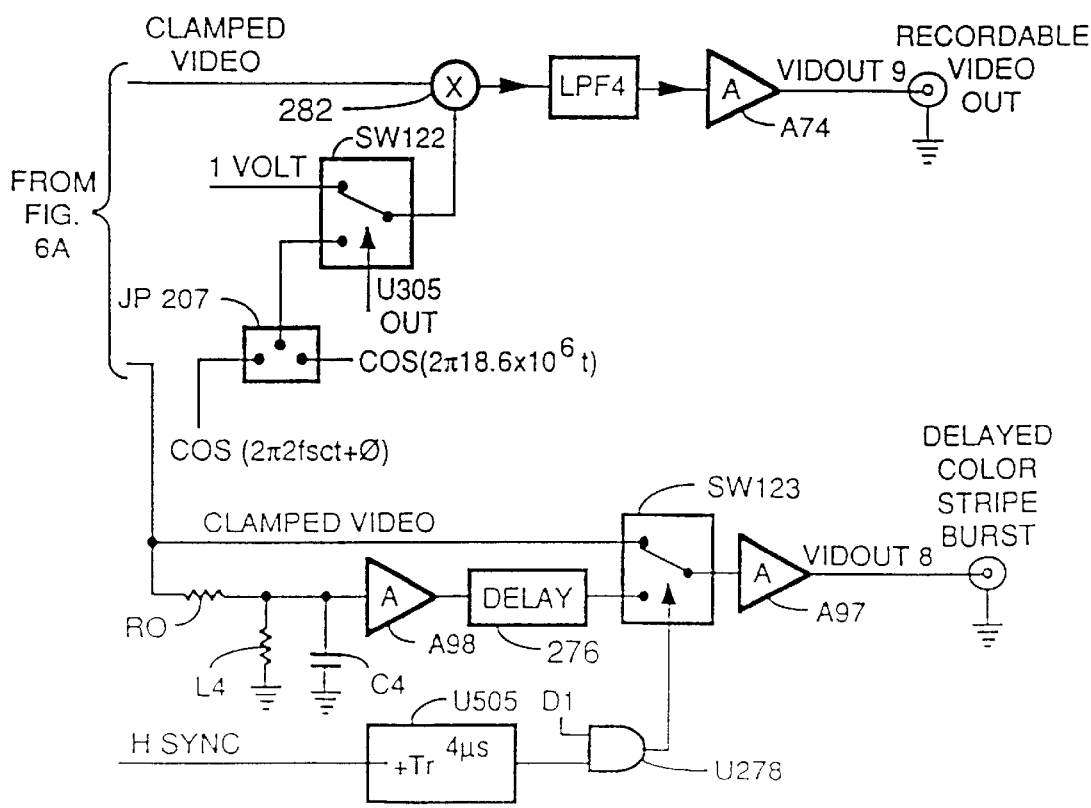

FIGS. 6A, 6B illustrate other circuits to use the color subcarrier and pulses generated by the circuitry of FIG. 4C to produce recordable (copiable) video output signals.

A fifth technique for producing a recordable video signal eliminates the effect of the horizontal sync pulses associated with the color stripe bursts, using level shifting the horizontal sync pulses. The effects of level shifting are described in "Method and Apparatus For Displaying Anti-Copy Protection In Video Signals", U.S. Pat. No. 5,194,965 issued to Quan et al. on Mar. 16, 1993, and which is incorporated by reference.

This fifth technique is accomplished as follows. Clamped video on line 108 from FIG. 4C is coupled to a first input terminal of summing amplifier A99. The other input terminal of amplifier A99 is connected to an output terminal of gate U120 which may contain a positive going horizontal sync pulse coincident with a color stripe burst. The output terminal of gate U120 may also carry part of a horizontal sync pulse coincident with some of the color stripe bursts. Which lines are affected is a function of the timing described in the fourth technique above. Thus the level shift of the horizontal sync pulse may occur only in a portion of a specific line or in the specific lines having color bursts. The amount of level shifting may adjusted to produce the amount needed to produce a recordable video output. The output of terminal summing amplifier A99 250 provides the recordable video output signal with level shifted horizontal sync pulses.

A sixth techniques for producing a recordable video signal is to eliminate the effect of the horizontal sync pulses associated with the color stripe bursts by clipping the associated horizontal sync pulses.

The sixth technique is accomplished as follows. A sync clipping circuit includes amplifier A91, transistor QBCL and resistor RS. Amplifier A91 inverts and attenuates the logic level of the gate U120 output signal described above. The output signal of amplifier A91 is typically about zero IRE to −10 IRE. When the clamped video signal is coupled through resistor Rs, its horizontal sync pulses will be clipped to −10 IRE during a portion of or all the color stripe burst lines, depending upon the logic level output of gate U120. In addition, each horizontal sync pulse may be clipped for its full duration or part of its duration. The amount of clipping duration depends on the ability to make a recordable copy. Amplifier A77 outputs the recordable video signal VIDOUT 6 with clipped horizontal synchronizing signals.

A seventh technique for producing a recordable video output is to eliminate the effect of the horizontal sync pulses associated with the color stripe bursts by widening those horizontal sync pulses.

This is accomplished as follows. The clamped video signal on line 108 is coupled to a first input terminal of switch SW124. The second input terminal of switch SW124 is coupled to a widened horizontal sync signal which is provided by the DD3 output terminal of EPROM U70. Switch SW124 is controlled by the signal at the output terminal of AND Gate U123 that ANDs the horizontal blanking signal at terminal DD4 of EPROM U70 and the active field lines output signal on line 64.

This seventh technique uses the output signal of gate U120 to control switch SW124. The resultant signal on any video lines determined to have color stripe burst signals is no color burst, because the widened horizontal sync eliminates the color burst. Unity gain amplifier A88 couples the recordable video output with the widened horizontal synchronizing signals to the VCR.

Figure 7:
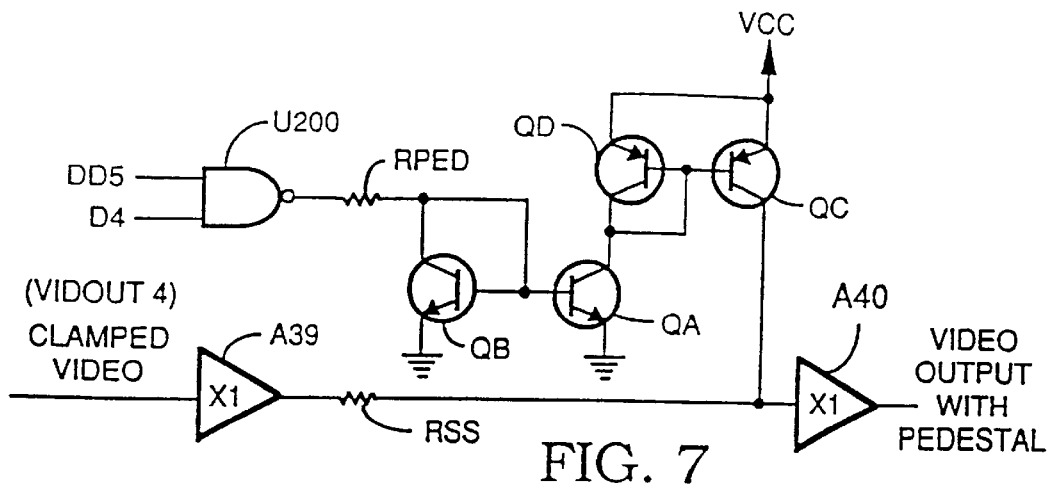
FIG. 7 shows a circuit to improve playability, for use with elimination of horizontal sync pulses.

FIG. 7 shows a circuit to improve playability in conjunction with elimination of horizontal sync pulses, by adding an offset voltage to video that has the horizontal sync pulses eliminated. This added offset voltage allows the sync separator in a TV or VCR not to slice at video levels caused by missing horizontal sync pulses.

To generate a voltage pedestal during the active lines of the active field, the active horizontal line pixel locations indicated by a signal at terminal DD5 of EPROM U70 are logically combined by AND gate U467 with the signal at terminal D4, which indicates the active field line locations. The output of gate U467 is provided to a current mirror including transistors $Q_A$ and $Q_B$ via resistor Rped. The collector of transistor $Q_A$ feeds a current mirror including transistors $Q_D$ and $Q_c$. The collector of transistors $Q_c$ then injects a pedestal current into resistor Rss to add a pedestal voltage to the clamped video input. The output signal (via a buffer amplifier A40) then feeds into the various horizontal sync pulse clipping,shifting or blanking circuits described herein.

An eighth technique for producing a recordable video output is to delay the color stripe burst so as to be out of the range of the burst detection circuitry, to effectively cause the color burst to "drop out."

The technique is accomplished as follows. Clamped video on line 108 is coupled to a chroma band pass filter including resistor Ro, inductor L4 and capacitor C4 and to a first input terminal of switch SW123. The output signal of the chroma pass filter is buffered and amplified by amplifier A98. The output terminal of amplifier A98 is coupled to delay line 276 which delays the chroma output of the band pass filter by e.g. 2 microseconds. The output terminal of the delay line 276 is coupled to a second input terminal of switch SW123. Switch SW123 is controlled by the output signal of AND Gate U278. Horizontal sync pulses from sync separator U1 are coupled to the input terminal of one-shot U505 which generates a 4 microsecond pulse triggered by the trailing edge of the horizontal sync input signal. AND Gate U278 generates a control signal for switch SW123 from a logical combination of the output signal of one-shot U505 and the D1 terminal output signal of EPROM U5 which is a signal representing some locations of color stripe Lines (SCSL), as described above.

The output signal of switch SW123 has a delayed color burst on video lines having color stripe bursts. The delayed color burst is not detected by a VCR. Therefore the VCR is not responsive to the lines having a color stripe burst. Amplifier A97 buffers the output signal of switch SW123 and provides an output signal with delayed color stripe bursts that is recordable.

A ninth technique for producing a recordable video signal uses signal multiplying (heterodyning) to shift the color stripe burst phase to be correct and/or to shift the color stripe bursts out of the frequency range of the burst detection circuitry, to effectively cause the VCR color burst to "drop out".

Clamped video on line 108 is coupled to a first input terminal of signal multiplier 282, the second input terminal of is connected to a 1 volt DC signal most of the time, as controlled by signal SW122. To control the color stripe burst phase, switch SW122 couples via jumper JP207 the cos $(2\pi f_{sc}t+\phi)$ signal from FIG. 4C generated by frequency double amplifier A10 and phase shifter $\phi 4$, or to shift the color stripe burst out of frequency range, a $\cos(2\pi 18.6\times 10^6 t)$ signal from any oscillator source is used to heterodyne the color stripe bursts. Switch SW122 is controlled by the output of AND gate U305.

Because of the 1 volt DC at switch SW122 and the control signal from gate U305, the output signal of multiplier 282 is "transparent" (equal to the signal on line 108) during most of the time. During the time of color stripe burst signals as determined by the output signal of gate U305 however, the output signal of multiplier 282 is equal to color stripe frequency plus a corrected color burst phase angle or $\cos(2\pi f_{sc}t+\phi_A)$ and three times the color burst frequency plus another phase angle or $\cos(2\pi 3f_{sc}t+\phi_B)$. The output multiplier is coupled to low pass filter LPF4. Low pass filter LPF4 has a cut off frequency of about 5 MHz so that the three times color burst frequency is eliminated. The output signal of low pass filter LPF4 is coupled to amplifier A74 that buffers the output signal of low pass filter LPF4 and provides an output with color stripe burst that hence are recordable.

If the second input terminal of switch SW122 is coupled to an 18.6 MHz sine wave, and low pass filter LPF4 is designed to cut off at 16 MHz, the output signal of multiplier 282 during the color stripe burst time, as determined by the output of gate U305, will have burst frequencies of about 15 MHz and 22 MHz. Such a LPF4 will pass through the 15 MHz burst during the color stripe times. When this signal is coupled to a VCR, the VCR's chroma input filter will be unresponsive to the 15 MHz since it is expecting a 3.58 MHz burst (and filters out higher frequency). Thus during the lines with color stripe bursts, the color stripe burst is defeated.

Figure 8:
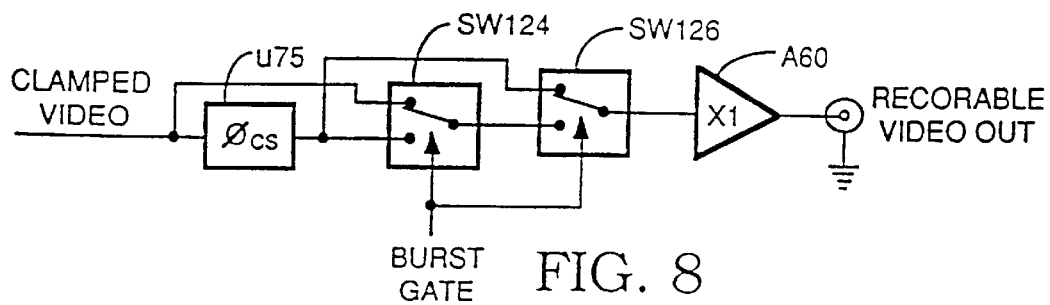
FIG. 8 shows another circuit to defeat the color stripe process.

FIG. 8 shows a circuit for carrying out the above described method of replacing correct phase color bursts with color stripe bursts and then modifying the chroma phase to that of the color stripe bursts. The clamped video signal is provided to phase shifter U75, which shifts the phase by an amount equal to the difference between that of the color stripe bursts and the correct color burst phase. Switch SW124, controlled by the burst gate signal, outputs the clamped video having in each line of the TV field a color burst having the phase of the color stripe burst. Similarly controlled switch U126 then in turn outputs the clamped video having each TV horizontal line phase shifted (including the active chroma) to match the phase shift of the color stripe burst, which signal is copiable.

Figure 9:
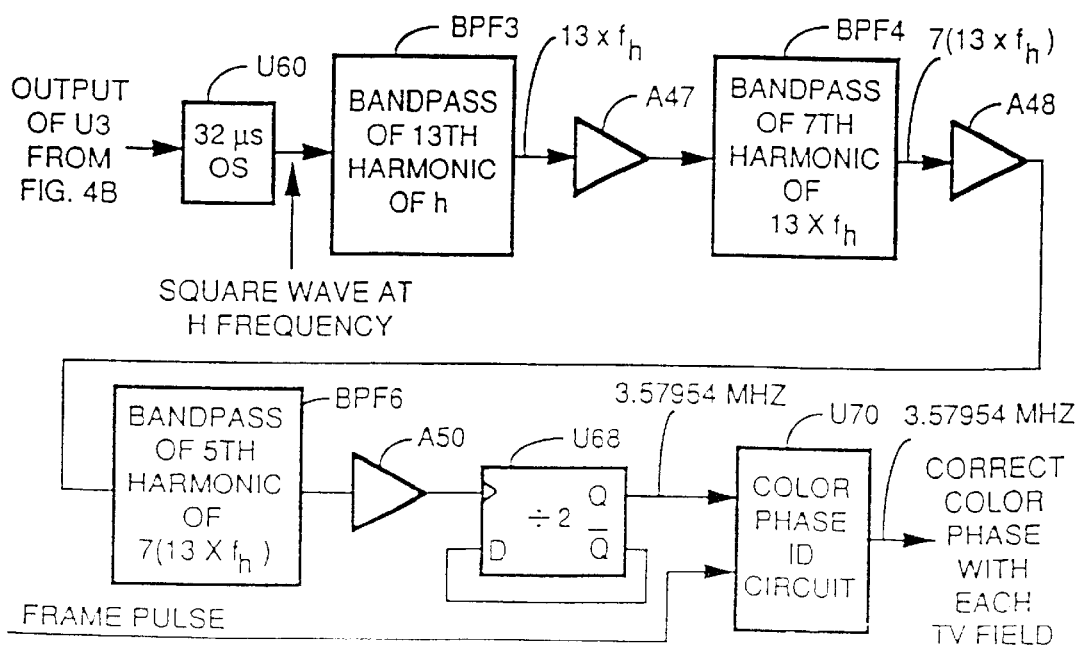
FIG. 9 shows a circuit for subcarrier regeneration.

FIG. 9 illustrates a circuit for subcarrier regeneration without the use of a phase lock loop or a voltage control oscillator, for use in conjunction with the above described circuitry in one embodiment of the invention. The output signal from one shot U3 of FIG. 4B is provided to a 32 $\mu$sec one shot U60, the output signal of which is the equivalent of the horizontal line frequency i.e. a square wave with the horizontal line frequency. This signal is provided to a band pass filter BPF3 which passes a 13th harmonic of horizontal sync. Thus this signal which is 13 times the horizontal frequency is fed to a limiter amplifier A47 which in turn is connected to the input terminal of a bandpass filter BPF4 which passes the seventh harmonic of the 13 times the horizontal frequency. This frequency, which is seven times the 13th harmonic of the horizontal frequency, is provided to a second limiter amplifier A48 which in turn is connected to the input terminal of a band pass filter BPFG which passes a band of a fifth harmonic of seven times the 13th harmonic of the horizontal frequency, and which in turn is connected to another limiter amplifier A60 which connects to the clock terminal of a divide by 2 counter U68. The noninverting Q output terminal of counter U68 provides a signal of 3.57954 MHz which of course is exactly the desired subcarrier frequency for NTSC television. This signal in turn is the first input to a color phase identification circuit U70 (similar to that shown in FIG. 4C) which provides as an output signal thereof (in response to the frame pulse provided at the other input terminal) the desired correct color phase and frequency subcarrier for each TV field. A similar scheme to regenerate color subcarrier can be done via vertical sync signals through frequency multipliers and/or (crystal) phase lock loop circuits.

This disclosure is illustrative and not limiting; further modifications will be apparent to one skilled in the art and are intended to fall within the scope of the appended claims.

We claim:

1. A method of modifying a video signal, the video signal including a plurality of video lines, each video line including a color burst having a predetermined phase, wherein selected video lines include a color burst having an incorrect phase other than the predetermined phase, said color burst of incorrect phase defining a copy protection signal, the method comprising the steps of:

determining a duration of a portion of the color burst having incorrect phase; and modifying the phase of a part of said portion of the color burst while maintaining the incorrect phase in a remaining portion of the color burst, to attenuate the effects of the copy protection signal.

2. The method of claim 1, wherein the step of modifying includes the step of shifting the phase of said part of said portion of incorrect phase by 180°.

3. The method of claim 1, wherein the step of attenuating includes the step of shifting the phase of said part of said portion of incorrect phase by at least 20°.

4. The method of claim 1, wherein at least 60% of said portion of incorrect phase is modified while maintaining the incorrect phase in the remaining portion of the color burst, to attenuate the effects of the copy protection signal.

5. The method of claim 1, wherein a normal duration of the color burst is eight to ten cycles of a color subcarrier signal, and the step of modifying includes modifying said portion of incorrect phase of more than six of the cycles.

6. The method of claim 1, wherein:

said portion of incorrect phase is more than one-half of the duration of selected color bursts; and the step of modifying comprises modifying the phase of said more than one-half of the duration of selected color bursts in more than one-half of the selected video lines to cause the attenuation of the effects of the copy protection signal.

7. The method of claim 1, wherein a band of video lines is subject to the step of modifying the effects of said portion of incorrect phase of the color burst, followed by a band of video lines which are not subject to the step of modifying.

8. A method of modifying a video signal formed of a plurality of video lines, the video signal including a copy protection signal formed of color stripe bursts of incorrect phase and predetermined duration in selected video lines of the plurality of video lines, the method comprising the steps of:

determining the selected video lines having the color stripe bursts of incorrect phase;

determining a duration of a selected portion of incorrect phase of the color stripe burst; and modifying the incorrect phase of said selected portion of the duration of selected bursts of the color stripe bursts while maintaining the incorrect phase in a remaining portion of the color stripe bursts, to attenuate the effects of the copy protection signal on a television set or VCR.

9. The method of claim 8, wherein the modified portion precedes an unmodified portion of the selected color stripe bursts.

10. The method of claim 8, wherein an unmodified portion precedes the modified portion of the selected color stripe bursts.

11. The method of claim 8, wherein a first unmodified portion precedes the modified portion and a second unmodified portion follows the modified portion of the selected color stripe bursts.

12. The method of claim 8, wherein a first modified portion precedes an unmodified portion and a second modified portion follows an unmodified portion of the selected color stripe bursts.

13. The method of claim 8, wherein the step of modifying includes the step of shifting the predetermined phase by 180°.

14. The method of claim 8, wherein the step of modifying includes the step of shifting the predetermined phase by at least 20°.

15. The method of claim 8, wherein said selected portion is less than 50% of the duration of the color stripe burst and is modified to attenuate the effects of the copy protection signal.

16. The method of claim 8, wherein a duration of the color stripe burst is eight to ten cycles of a color subcarrier signal, and the step of modifying includes modifying said selected portion of less than six of the cycles.

17. The method of claim 8, wherein the step of modifying comprises: modifying the phase of less than one-half of said selected portion of the duration of the selected color stripe bursts in less than one-half of the selected video lines to cause the attenuation of the effects of the copy protection signal.

18. The method of claim 8, wherein a band of video lines is subject to the step of modifying the effects of said selected portion of incorrect phase of the color stripe burst, followed by a band of video lines which are not subject to the step of modifying.

* * * * *